United States Patent
Yonan et al.

(10) Patent No.: US 9,951,704 B2
(45) Date of Patent: Apr. 24, 2018

(54) NO START EVENT MONITORING

(71) Applicant: GM GLOBAL TECHNOLOGY OPERATIONS LLC, Detroit, MI (US)

(72) Inventors: Jakob Yonan, Sterling Heights, MI (US); Mark J. Rychlinski, Farmington Hills, MI (US); Gary W. Gantt, Jr., Sterling Heights, MI (US); Varsha K. Sadekar, Detroit, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 61 days.

(21) Appl. No.: 14/847,499

(22) Filed: Sep. 8, 2015

(65) Prior Publication Data

US 2017/0067404 A1    Mar. 9, 2017

(51) Int. Cl.
| | |
|---|---|
| *F02D 41/22* | (2006.01) |
| *G01M 15/06* | (2006.01) |
| *F02N 11/10* | (2006.01) |
| *G07C 5/00* | (2006.01) |
| *G07C 5/08* | (2006.01) |
| *F02N 11/08* | (2006.01) |

(52) U.S. Cl.
CPC ............ *F02D 41/22* (2013.01); *F02N 11/108* (2013.01); *G01M 15/06* (2013.01); *G07C 5/008* (2013.01); *G07C 5/0808* (2013.01); *F02N 11/0848* (2013.01); *F02N 2200/044* (2013.01)

(58) Field of Classification Search
CPC .................................................... G01M 15/06
See application file for complete search history.

(56) References Cited

U.S. PATENT DOCUMENTS

| | | | | | |
|---|---|---|---|---|---|
| 1,499,119 | A | * | 6/1924 | Muhlfeld | B61C 15/02 105/109 |
| 1,575,665 | A | * | 3/1926 | Wagner | B60K 3/02 60/668 |
| 4,403,208 | A | * | 9/1983 | Hodgson | G08B 1/08 340/902 |
| 5,589,827 | A | * | 12/1996 | Scurati | G08G 1/163 180/167 |

(Continued)

FOREIGN PATENT DOCUMENTS

| CN | 101417653 A | 4/2009 |
|---|---|---|
| CN | 101763665 A | 6/2010 |

OTHER PUBLICATIONS

SIPO, First Office Action issued in Chinese Application No. 201610751724.9, dated Jan. 17, 2018.

*Primary Examiner* — Hieu T Vo
*Assistant Examiner* — Sherman Manley
(74) *Attorney, Agent, or Firm* — Lorenz & Kopf, LLP (57) ABSTRACT

Methods and systems for monitoring no start events for vehicles are provided. In accordance with one embodiment, a vehicle includes an engine, a sensing unit, a processor, and a transmitter. The sensing unit is configured to measure one or more parameter values for a vehicle after a request has been made to start the engine. The processor is coupled to the sensing unit, and configured to determine when a no start event has occurred for the vehicle using the one or more parameter values. The transmitter is coupled to the processor, and is configured to transmit, to a remote server, a no start event history for the vehicle based on the determining by the processor.

20 Claims, 3 Drawing Sheets

(56) References Cited

U.S. PATENT DOCUMENTS

| | | | | |
|---|---|---|---|---|
| 5,928,294 | A * | 7/1999 | Zelinkovsky | G05D 1/0265 180/168 |
| 7,020,595 | B1 * | 3/2006 | Adibhatla | G05B 23/0254 700/30 |
| 7,449,994 | B1 * | 11/2008 | Koerner | F02B 61/045 340/438 |
| 7,689,334 | B2 * | 3/2010 | Massen | G01M 15/05 701/31.4 |
| 8,533,018 | B2 * | 9/2013 | Miwa | E02F 9/20 705/305 |
| 8,676,432 | B2 * | 3/2014 | Patnaik | G06F 17/30548 701/29.1 |
| 9,446,705 | B2 * | 9/2016 | Dwyer | A01D 34/6818 |
| 2003/0051692 | A1 * | 3/2003 | Mizutani | F02D 11/105 123/179.15 |
| 2003/0055666 | A1 * | 3/2003 | Roddy | B61L 27/0094 705/305 |
| 2005/0278109 | A1 * | 12/2005 | Ando | F02D 41/009 701/112 |
| 2006/0258508 | A1 * | 11/2006 | Tanioka | B60R 25/04 477/203 |
| 2008/0059120 | A1 * | 3/2008 | Xiao | G06F 11/008 702/184 |
| 2009/0192700 | A1 * | 7/2009 | Votoupal | F02N 11/10 701/113 |
| 2009/0281690 | A1 * | 11/2009 | Sasaki | G06F 11/1441 701/33.4 |
| 2010/0026306 | A1 * | 2/2010 | Zhang | G01R 31/3693 324/426 |
| 2010/0175656 | A1 * | 7/2010 | Doub | F02N 11/10 123/179.3 |
| 2010/0248560 | A1 * | 9/2010 | Ito | B63H 21/22 440/1 |
| 2012/0283988 | A1 * | 11/2012 | Pandey | G06Q 30/06 702/179 |
| 2012/0310474 | A1 * | 12/2012 | Sakakibara | G07C 5/085 701/33.4 |
| 2013/0110382 | A1 * | 5/2013 | Ishikawa | F02N 11/0848 701/112 |
| 2013/0291835 | A1 * | 11/2013 | Imamura | F02D 13/02 123/445 |
| 2013/0305081 | A1 * | 11/2013 | Agnihotram | G06F 11/0793 714/2 |
| 2014/0222316 | A1 * | 8/2014 | Murai | F02D 41/064 701/104 |
| 2015/0032326 | A1 * | 1/2015 | Fushiki | B60K 6/365 701/32.1 |
| 2017/0256102 | A1 * | 9/2017 | Bell | F02N 11/108 |

* cited by examiner

NO START EVENT MONITORING

TECHNICAL FIELD

The present disclosure generally relates to vehicles, and more particularly relates to methods and systems for monitoring no start events for vehicles.

BACKGROUND

Various types of vehicles, including automotive vehicles, include engines that are started in order to place the vehicle in a driving mode. In certain situations, a vehicle may experience a no start event, in which a vehicle has not started when requested by a user of the vehicle.

Accordingly, it is desirable to provide techniques for monitoring vehicle no start events. It is also desirable to provide methods, systems, and vehicles utilizing such techniques. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided. The method comprises measuring one or more parameter values for a vehicle using a sensor unit after a request has been made to start an engine of the vehicle; determining when a no start event has occurred for the vehicle via a processor using the one or more parameter values; and generating a no start event history for the vehicle based on the determining by the processor.

In accordance with another exemplary embodiment, a system is provided. The system comprises a sensing unit, a processor, and a transmitter. The sensing unit is configured to measure one or more parameter values for a vehicle after a request has been made to start an engine of the vehicle. The processor is coupled to the sensing unit, and is configured to determine when a no start event has occurred for the vehicle using the one or more parameter values. The transmitter is coupled to the processor and configured to transmit, to a remote server, a no start event history for the vehicle based on the determining by the processor.

In accordance with a further exemplary embodiment, a vehicle is provided. The vehicle comprises an engine, a sensing unit, a processor, and a transmitter. The sensing unit is configured to measure one or more parameter values for a vehicle after a request has been made to start the engine. The processor is coupled to the sensing unit, and configured to determine when a no start event has occurred for the vehicle using the one or more parameter values. The transmitter is coupled to the processor, and is configured to transmit, to a remote server, a no start event history for the vehicle based on the determining by the processor.

DESCRIPTION OF THE DRAWINGS

The present disclosure will hereinafter be described in conjunction with the following drawing figures, wherein like numerals denote like elements, and wherein:

FIG. 2 is a flowchart of a process for monitoring no start events for vehicles, and that can be used in connection with the vehicle and the remote server of FIG. 1, in accordance with an exemplary embodiment.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
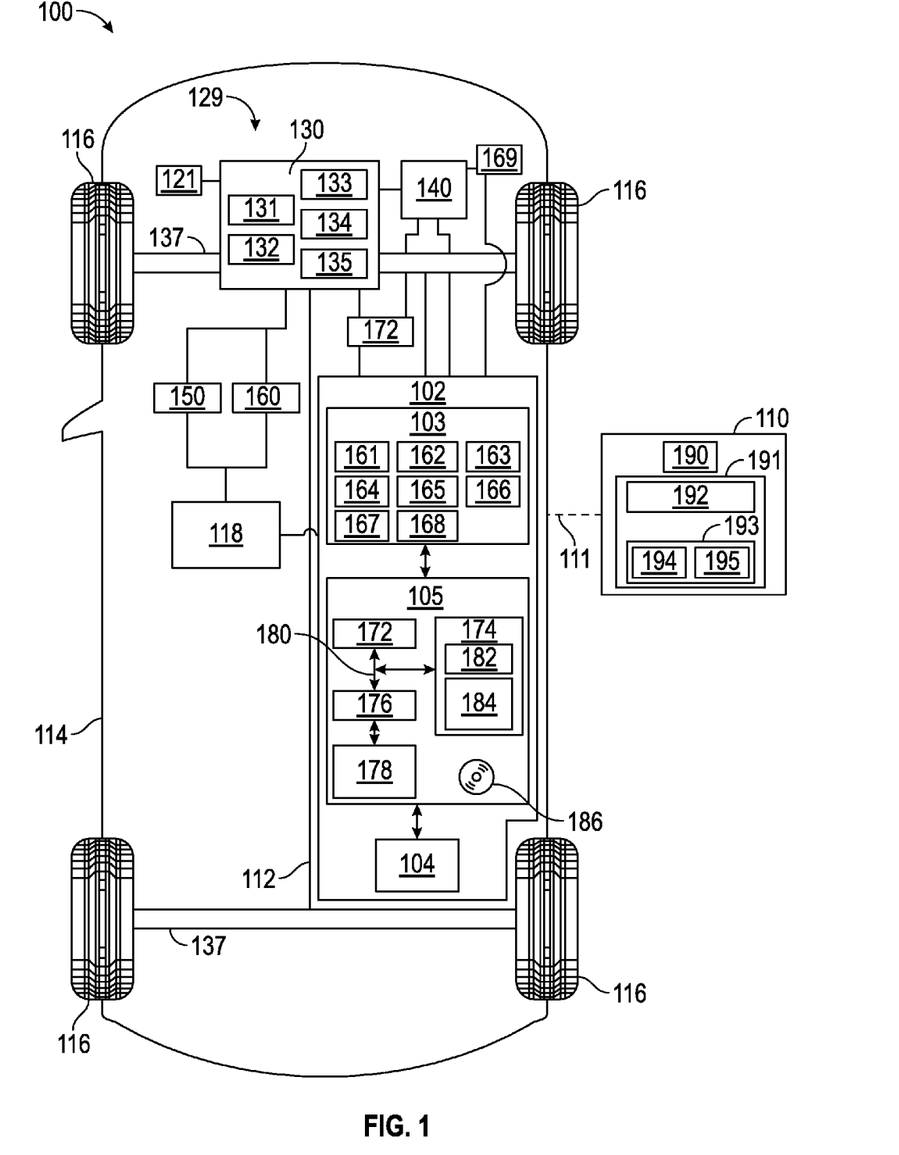
FIG. 1 is a functional block diagram of a vehicle that includes an engine and a control system for monitoring no start events for the vehicle, depicted alongside a remote server for use in monitoring the no start events, in accordance with an exemplary embodiment.

FIG. 1 illustrates a vehicle 100, or automobile, according to an exemplary embodiment. The vehicle 100 is depicted alongside a remote server 110, which communicates with the vehicle via a communications network 111. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD).

As described in greater detail further below, the vehicle 100 includes an engine 130 and a control system 102. The control system 102 monitors whether the vehicle 100 starts when requested by a user, including the monitoring of no start events for the vehicle 100. As referenced herein, a vehicle "start" refers to the placement of the vehicle 100 in a driving mode of operation. In the depicted example in which the vehicle includes an engine 130, a vehicle "start" refers to the starting of the engine 130 in a sufficient matter such that the vehicle 100 is placed in a driving mode of operation (i.e., such that the vehicle 100 can be driven in a desired manner along a roadway or path). Also as used herein, a "no start event" refers to an event in which the vehicle 100 has not started (e.g. the engine 130 has not started) when requested by a user of the vehicle 100 (e.g. after the driver of the vehicle 100 has turned a key in an ignition of the vehicle 100, engaged a "start" button for the vehicle, or has otherwise provided a command for the starting of the vehicle 100, e.g. the engine 130). As depicted in FIG. 1, in certain embodiments the vehicle no start events are monitored via the vehicle 100 (and other similar vehicles) along with the remote server 110 depicted in FIG. 1.

As depicted in FIG. 1, the vehicle 100 includes, in addition to the above-referenced engine 130 and control system 102, a chassis 112, a body 114, four wheels 116, an electronic control system 118, an energy storage system (ESS) 140, a steering system 150, and a braking system 160. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114. In various embodiments the vehicle 100 may differ from that depicted in FIG. 1. For example, in certain embodiments the number of wheels 116 may vary. By way of additional example, in various embodiments the vehicle 100 may not have a steering system, and for example may be steered by differential braking, among various other possible differences.

In the exemplary embodiment illustrated in FIG. 1, the engine 130 is part of a propulsion system 129 for the vehicle 100. The propulsion system 129 is mounted on the chassis 112 and drives the wheels 116. In the depicted embodiment, the propulsion system 129 comprises an actuator assembly that includes the engine 130 as well as a starting mechanism 121 and the above-referenced ESS 140.

In one embodiment, the engine 130 comprises a combustion engine. In other embodiments, the propulsion system 129 may include one or more other types of engines and/or motors, such as an electric motor/generator, instead of or in addition to the combustion engine. As used herein, the term "engine" refers to combustion engines as well as electric motor/generators and/or other types of engines and/or motors.

In the embodiment depicted in FIG. 1, the engine 130 includes, among other components, one or more cylinder units 131, crank shafts 132, injectors 133, cam shafts 134, and relays 135. In one embodiment, the cylinder units 131 include pistons that provide reciprocating energy when the engine 130 is operating. Also in one embodiment, the crank shafts 132 convert the reciprocating energy to rotational energy, the injectors 133 provide fuel for operation of the engine 130 (e.g. gasoline for combustion, in one embodiment), the cam shafts 134 operate poppet values of the engine 130, and the relays 135 provide an indication of the starting of the engine 130.

Also in one embodiment, the engine 130 is started once a user command is initiated via the starting mechanism 121 of FIG. 1. In one embodiment, the starting mechanism comprises an ignition for the vehicle 100 that is started via a turning of the key by the driver of the vehicle 100. In other embodiments, the starting mechanism comprises a starting button (e.g. proximate the ignition, on or proximate a dash of the vehicle, or as part of a remote key fob for use with the vehicle 100) and/or other starting device by which a driver or other user of the vehicle 100 may provide a command to start the engine 130.

In certain embodiments, the ESS 140 comprises one or more batteries of the vehicle 100. For example, in one embodiment, the ESS 140 comprises a rechargeable twelve volt (12 V) battery for the vehicle 100. In other embodiments, the ESS 140 may comprise one or more other batteries, such as a twenty four volt (24 V), forty-eight volt (48 V), one or more hybrid vehicle batteries, and/or one or more other types of batteries. In other embodiments, the ESS 140 may comprise any number of other different types of energy storage devices, such as one or more ultracapacitors, supercapacitors, lithium ion, and/or other types of energy storage devices. In certain embodiments, the ESS 140 is used for starting the engine 130. In addition, in certain embodiments, the ESS 140 is used to operate one or more other vehicle components (e.g. radio, climate control, and the like).

Still referring to FIG. 1, the engine 130 is coupled to at least some of the wheels 116 through one or more drive shafts 137. In some embodiments, the engine 130 is mechanically coupled to the transmission. In other embodiments, the engine 130 may instead be coupled to a generator used to power an electric motor that is mechanically coupled to the transmission. In certain other embodiments (e.g. electrical vehicles), an engine and/or transmission may not be necessary.

The steering system 150 is mounted on the chassis 112, and controls steering of the wheels 116. The steering system 150 includes a steering wheel and a steering column (not depicted). The steering wheel receives inputs from a driver of the vehicle 100. The steering column results in desired steering angles for the wheels 116 via the drive shafts 137 based on the inputs from the driver. Similar to the discussion above regarding possible variations for the vehicle 100, in certain embodiments the vehicle 100 may not include a steering wheel and/or steering. In addition, in certain embodiments, an autonomous vehicle may utilize steering commands that are generated by a computer, with no involvement from the driver.

The braking system 160 is mounted on the chassis 112, and provides braking for the vehicle 100. The braking system 160 receives inputs from the driver via a brake pedal (not depicted), and provides appropriate braking via brake units (also not depicted). The driver also provides inputs via an accelerator pedal (not depicted) as to a desired speed or acceleration of the vehicle. Similar to the discussion above regarding possible variations for the vehicle 100, in certain embodiments steering, braking, and/or acceleration can be commanded by a computer instead of by a driver.

The control system 102 is mounted on the chassis 112. The control system 102 monitors the status of the engine 130, including no start events for the engine 130 (and thus for the vehicle 100), and communicates information pertaining to a no start event history via the wireless communications network 111 to the remote server 110. As depicted in FIG. 1, the control system 102 includes a sensor array (also referred to herein as a sensor unit) 103, a transceiver 104, and a controller.

The sensor array 103 includes various sensors (also referred to herein as sensor units) that are utilized to measure and/or otherwise determine parameter values for use in monitoring a no start history for the vehicle 100. In the depicted embodiment, the sensor array 103 includes one or more cylinder unit sensors 161, crank shaft sensors 162, injector sensors 163, cam shaft sensors 164, relay sensors 165, starting mechanism sensors 166, control system sensors 167, and current/voltage sensors 168. The measurements and information from the various sensors of the sensor array 103 are provided to the controller 105 for processing.

In one embodiment, (i) the cylinder unit sensors 161 monitor position and movement of the cylinder unit 131 (e.g. a speed of pistons thereof); (ii) the crank shaft sensors 162 monitor position and movement of the crank shaft 132 (e.g. the revolutions per minute, or RPM, of the crank shaft 132); (iii) the injector sensors 163 monitor the injectors 133 (e.g. a level or velocity of flow of fluid therein); (iv) the cam shaft sensors 164 monitor position and movement of the cam shaft 134 (e.g. the revolutions per minute, or RPM, of the cam shaft 134); (v) the relay sensors 165 monitor the relay 135 (e.g. a voltage of the relay 135); (vi) the starting mechanism sensors 166 monitor engagement of the starting mechanism 121 (e.g. as to when the starting mechanism 121 is engaged by a driver of the vehicle 100); (vii) the control system sensors 167 monitor the control system 102 (e.g. a voltage of the control system 102); and (viii) the current/voltage sensors 168 measure current and/or voltage of the ESS 140 (e.g. battery). Also in one embodiment, one or more additional current/voltage sensors 169 are disposed within, adjacent to, or in close proximity to the ESS 140, and provide measurements and/or determinations regarding ESS current and/or voltage to the control system 102, as depicted in FIG. 1. In one embodiment, the current/voltage sensors 169 include an intelligent, or smart, battery sensor, and that includes a processor, disposed on or near the ESS 140 with relatively higher sampling rates and relatively higher maximum/minimum thresholds for measurement as compared with traditional current sensors. The measurements and information from the various sensors of the sensor array 103 are provided to the controller 105 for processing and for use in monitoring no start events for the vehicle 100.

In certain embodiments, the transceiver 104 obtains and transmits data from and between one or more other systems or devices. As depicted in FIG. 1, the transceiver 104 communicates data and information with the no start history of the vehicle 100 to the remote server 110. Also in certain embodiments, in certain embodiments the transceiver 104 receives data, information, and/or instructions from the remote server 110, for example to implement actions to help prevent or remedy no start events. In addition, in certain embodiments, the transceiver 104 obtains data from the starting mechanism 121, the sensor array 103, and/or other devices of or related to the vehicle 100. While the term "transceiver" 104 is used in various places in the application (as denoting both a transmitter and a receiver), in certain embodiments the transceiver 104 may comprise a transmitter without a receiver.

The controller 105 is coupled to the sensor array 103 and to the transceiver 104. The controller 105 utilizes the various measurements and information from the sensor array 103 and the transceiver 104 for monitoring a no start history for the vehicle 100. The controller 105, along with the sensor array 103 and the transceiver 104, also provide additional functions, such as those discussed further below in connection with the schematic drawings of the vehicle 100 in FIG. 1 and the process 200 of FIG. 2, discussed further below.

As depicted in FIG. 1, the controller 105 comprises a computer system. In certain embodiments, the controller 105 may also include one or more of the sensors of the sensor array 103, one or more other devices and/or systems, and/or components thereof. In addition, it will be appreciated that the controller 105 may otherwise differ from the embodiment depicted in FIG. 1. For example, the controller 105 may be coupled to or may otherwise utilize one or more remote computer systems and/or other control systems, such as the electronic control system 118 of FIG. 1.

In the depicted embodiment, the computer system of the controller 105 includes a processor 172, a memory 174, an interface 176, a storage device 178, and a bus 180. The processor 172 performs the computation and control functions of the controller 105, and may comprise any type of processor or multiple processors, single integrated circuits such as a microprocessor, or any suitable number of integrated circuit devices and/or circuit boards working in cooperation to accomplish the functions of a processing unit. During operation, the processor 172 executes one or more programs 182 contained within the memory 174 and, as such, controls the general operation of the controller 105 and the computer system of the controller 105, generally in executing the processes described herein, such as the process 200 described further below in connection with FIG. 2.

The memory 174 can be any type of suitable memory. For example, the memory 174 may include various types of dynamic random access memory (DRAM) such as SDRAM, the various types of static RAM (SRAM), and the various types of non-volatile memory (PROM, EPROM, and flash). In certain examples, the memory 174 is located on and/or co-located on the same computer chip as the processor 172. In the depicted embodiment, the memory 174 stores the above-referenced program 182 along with one or more stored values 184. In one embodiment, the stored values 184 comprise a circular buffer in which a recent no start history of the vehicle 100 is stored.

The bus 180 serves to transmit programs, data, status and other information or signals between the various components of the computer system of the controller 105. The interface 176 allows communication to the computer system of the controller 105, for example from a system driver and/or another computer system, and can be implemented using any suitable method and apparatus. In one embodiment, the interface 176 obtains the various data from the sensors of the sensor array 103. The interface 176 can include one or more network interfaces to communicate with other systems or components. The interface 176 may also include one or more network interfaces to communicate with technicians, and/or one or more storage interfaces to connect to storage apparatuses, such as the storage device 178.

The storage device 178 can be any suitable type of storage apparatus, including direct access storage devices such as hard disk drives, flash systems, floppy disk drives and optical disk drives. In one exemplary embodiment, the storage device 178 comprises a program product from which memory 174 can receive a program 182 that executes one or more embodiments of one or more processes of the present disclosure, such as the steps of the process 200 (and any sub-processes thereof) described further below in connection with FIG. 2. In another exemplary embodiment, the program product may be directly stored in and/or otherwise accessed by the memory 174 and/or a disk (e.g., disk 186), such as that referenced below.

The bus 180 can be any suitable physical or logical means of connecting computer systems and components. This includes, but is not limited to, direct hard-wired connections, fiber optics, infrared and wireless bus technologies. During operation, the program 182 is stored in the memory 174 and executed by the processor 172.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 172) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 105 may also otherwise differ from the embodiment depicted in FIG. 1, for example in that the computer system of the controller 105 may be coupled to or may otherwise utilize one or more remote computer systems and/or other control systems.

While the components of the control system 102 (including the sensor array 103, the transceiver 104, and the controller 105) are depicted as being part of the same system, it will be appreciated that in certain embodiments these features may comprise two or more systems. In addition, in various embodiments the control system 102 may comprise all or part of, and/or may be coupled to, various other vehicle devices and systems, such as, among others, the propulsion system 129, and/or the electronic control system 118.

The remote server 110 receives and implements the no start event history from the vehicle 100. In one embodiment, the remote server 110 is located physically remote and distant from the vehicle 100, and communicates with the vehicle 100 via a wireless communications network 111 (e.g. a cellular, satellite, Internet, and/or other wireless communications network).

In the embodiment depicted in FIG. 1, the remote server 110 includes a transceiver 190 and a computer system 191. Also as depicted in the embodiment of FIG. 1, the computer system 191 includes a processor 192 and a memory 193, with the memory having one or more programs 194 and stored values 195 stored therein. In one embodiment, the transceiver 190 of the remote server 110 communicates with the vehicle transceiver 104 via the communications network 111, and is similar in nature to the transceiver 104. Also in one embodiment, the computer system 191 is similar in nature to the computer system of the controller 105 of the vehicle 100. In addition, in one embodiment, the processor 192 of the remote server 110 controls the operation of the remote server 110, and is similar in nature to the processor 172 of FIG. 1. Furthermore, in one embodiment, the memory 193, programs 194, and stored values 195 of the remote server 110 are similar in nature to the memory 174, programs 182, and stored values 184 of the vehicle 100, respectively.

Also in one embodiment, the remote server 110 monitors the no start histories for the vehicle 100 as well as for various other vehicles on various roadways and paths. In addition, in one embodiment, the remote server 110 aggregates and categorizes the no start data in accordance with various types of vehicles, in order to make various determinations and recommend proposed actions to help remedy or prevent such no start events in the future. In one such embodiment, the remote server 110 provides this and other functionality in accordance with the steps provided in the process 200 of FIG. 2, discussed below.

FIG. 2 is a flowchart of a process 200 for monitoring vehicle no start events. The process 200 can be implemented in connection with the vehicle 100, including the control system 102 and engine 130, of FIG. 1, and in connection with the remote server 110 of FIG. 1, in accordance with an exemplary embodiment.

As depicted in FIG. 2, the process 200 begins when a vehicle start is requested (step 202). In one embodiment, step 202 occurs when a driver or other user of the vehicle 100 of FIG. 1 requests that the engine 130 of the vehicle 100 be started. In various embodiments, the start request is determined by the processor 172 of FIG. 1 based on information provided by the sensor array 103 of FIG. 1, for example from the starting mechanism sensors 166. In various embodiments, a start request may comprise, by way of non-limiting examples, a turning of a key, a pushing of a button, and/or other engagement of an ignition, a starting button, a remote key fob, and/or other starting mechanism 121 for the vehicle 100 by which a driver or other user of the vehicle 100 may provide a command to start the engine 130.

Various vehicle parameters are obtained (step 204). In one embodiment, various parameters pertaining to an engine start of the vehicle 100 are obtained via the sensor array 103 of FIG. 1 and are provided to the processor 172 of FIG. 1 for processing. Also in one embodiment, the parameters include the following: (i) the position and movement of the cylinder unit 131 (e.g. a speed of pistons thereof) as measured via the cylinder unit sensors 161; (ii) the position and movement of the crank shaft 132 (e.g. whether the crank shaft 132 has made a complete crank, along with the revolutions per minute, or RPM, of the crank shaft 132) measured via the crank shaft sensors 162; (iii) a level or velocity of flow of fluid within the injectors 133 measured via the injector sensors 163; (iv) the position and movement of the cam shaft 134 (e.g. the revolutions per minute, or RPM, of the cam shaft 134) measured via the cam shaft sensors 164; (v) a voltage of the relay 135 measured via the relay sensors 165; and (vi) a voltage of the control system 102 measured via the control system sensors 167. The measurements and information from the various sensors of the sensor array 103 are provided to the controller 105 for processing and for use in monitoring no start events for the vehicle 100.

The parameter values of step 204 are stored in memory (step 206). In one embodiment, the parameter values are stored in a circular buffer of the memory 174 of FIG. 1 as stored values 184 therein. In certain other embodiments, the parameters values may be stored on the remote server 110 (e.g. on memory 193). Various determinations are then made in steps 208-215 regarding the attempted start of the engine 130, in accordance with one embodiment discussed below.

A determination is made as to whether a crank of the engine has occurred in response to the request of step 202 (step 208). In one embodiment, this comprises a determination as to whether the crank shaft 132 of the engine 130 of FIG. 1 has experienced a crank of at least a full revolution. In one embodiment, this determination is made by the processor 172 of FIG. 1 based on a monitoring of a position and movement of the crank shaft 132 by the crank shaft sensors 162 of FIG. 1 as represented in the parameter values of step 204. Also in one embodiment, the crank of the engine has been deemed to have occurred if an Engine Crank Flag (stored as one of the stored values 184 of the memory 174 of FIG. 1) has previously been set to "True" by the processor 172. In certain embodiments, this step may be performed, in whole or in part, by one or more other processors, such as part of a remote server, for example the processor 192 of FIG. 1, and for example using stored values from the memory 193 of the remote server 110.

If it is determined in step 208 that an engine crank has not occurred, then a Vehicle No Start Flag is set to "True" (step 216). In one embodiment, the Vehicle No Start Flag is set to "True" in step 216 by the processor 172 of FIG. 1 as an indication that the vehicle engine 130 of FIG. 1 has failed to start. Also in one embodiment, the Vehicle No Start Flag is stored in the memory 174 of FIG. 1 as one of the stored values 184 therein. In certain other embodiments, other memory (such as the memory 193 of FIG. 1) may be utilized. The process then proceeds to step 220, discussed further below.

Conversely, if it is determined in step 208 that an engine crank has occurred, then a determination is made as to whether a voltage of a control module associated with the engine is within a predetermined range (step 210). In one embodiment, this determination is made by the processor 172 of FIG. 1 based on a measurement of a voltage of the control system 102 of FIG. 1 via the control system sensors 167 of FIG. 1 as represented in the parameter values of step 204. Also in one embodiment, the voltage of the control system is determined to be in a predetermined range in step 210 if the voltage value is greater than a minimum voltage threshold typically associated with engine starts and less than a maximum voltage threshold typically associated with engine starts. Also in one embodiment, the thresholds of step 210 are stored in the memory 174 of FIG. 1 as stored values 184 thereof. In certain embodiments, this step may be performed, in whole or in part, by one or more other processors and/or memory, such as part of a remote server, for example the processor 192 and memory 193 of FIG. 1.

If it is determined in step 210 that the voltage of the control system is not within the predetermined range of step 210, then the process proceeds to the above-discussed step 216, as the Vehicle No Start Flag is set to "True". Conversely, if it is determined instead that the voltage of the control system is within the predetermined range, the process proceeds instead to step 212, discussed directly below.

During step 212, a determination is made as to whether a voltage of a relay associated with the engine is within a predetermined range. In one embodiment, this determination is made by the processor 172 of FIG. 1 based on a measurement of a voltage of the relay 135 (e.g. a powertrain relay) of FIG. 1 via the relay sensors 165 of FIG. 1 as represented in the parameter values of step 204. Also in one embodiment, the voltage of the relay is determined to be in a predetermined range in step 212 if the voltage value is greater than a minimum voltage threshold typically associated with engine starts and less than a maximum voltage threshold typically associated with engine starts. Also in one embodiment, the thresholds of step 212 are stored in the memory 174 of FIG. 1 as stored values 184 thereof. In certain embodiments, this step may be performed, in whole or in part, by one or more other processors and/or memory, such as part of a remote server, for example the processor 192 and memory 193 of FIG. 1.

If it is determined in step 212 that the voltage of the relay is not within the predetermined range of step 212, then the process proceeds to the above-discussed step 216, as the Vehicle No Start Flag is set to "True". Conversely, if it is determined instead that the voltage of the relay is within the predetermined range, the process proceeds instead to step 214, discussed directly below.

During step 214, a determination is made as to whether a maximum crank speed of the engine is greater than a predetermined threshold. In one embodiment, this comprises a determination as to whether a maximum value (i.e. the highest value in the current start attempt) of the revolutions per minute (rpm) of the crank shaft 132 of the engine 130 of FIG. 1 has exceeded a predetermined threshold that would be expected based on a successful engine start. In one embodiment, this determination is made by the processor 172 of FIG. 1 based on a monitoring of a position and movement of the crank shaft 132 by the crank shaft sensors 162 of FIG. 1 as represented in the parameter values of step 204. Also in one embodiment, the predetermined threshold of step 214 is stored in the memory 174 of FIG. 1 as one of the stored values 184 stored therein. In certain embodiments, this step may be performed, in whole or in part, by one or more other processors and/or memory, such as part of a remote server, for example the processor 192 and memory 193 of FIG. 1.

If it is determined in step 214 that a maximum crank speed of the engine is less than or equal to the predetermined threshold of step 214, then the process proceeds to the above-discussed step 216, as the Vehicle No Start Flag is set to "True". Conversely, if it is determined instead that the maximum crank speed of the engine is greater than the predetermined threshold of step 214, then the process proceeds instead to step 215, discussed directly below.

During step 215, a determination is made as to whether a battery sensor no-start flag has already been set. In one embodiment, this comprises a determination as to whether sensor 169 of FIG. 1 (e.g. an intelligent battery sensor, having a processor) has made a determination that a vehicle no-start event has occurred based on measurements of current and voltage for the ESS 140 of FIG. 1 by the sensor 169. In one embodiment, if one or more such sensors measure a drop in voltage and increase in current for the ESS 140 in a manner consistent with a vehicle no-start event, then the determination in step 215 is determined to be "yes" (and otherwise the determination in step 215 is determined to be "no"). By way of further explanation, if the determination in step 215 is "yes", this matches a profile of a vehicle that has successfully started. Conversely, if the determination in step 215 is "no", this matches a profile of a vehicle for which there has been an abnormality in the starting process.

If the determination in step 215 is "no", then the process proceeds to the above-discussed step 216, as the Vehicle No Start Flag is set to "True". Conversely, if the determination in step 215 is "yes", then the process proceeds instead to step 218, discussed directly below.

During step 218, the Vehicle No Start Flag is set to "False". In one embodiment, the Vehicle No Start Flag is set to "False" in step 218 by the processor 172 of FIG. 1 as an indication that the vehicle engine 130 of FIG. 1 has succeeded in starting. Also in one embodiment, as noted above, the Vehicle No Start Flag is stored in the memory 174 of FIG. 1 as one of the stored values 184 therein. The process then proceeds to step 220, discussed further below. In certain embodiments, this step may be performed, in whole or in part, by one or more other processors and/or memory, such as part of a remote server, for example the processor 192 and memory 193 of FIG. 1.

Accordingly, in the depicted embodiment, the Vehicle No Start Flag is set to "True" in step 216 if each of the following conditions are satisfied, namely: (i) it is determined in step 208 that an engine crank has not occurred; (ii) it is determined in step 210 that the voltage of the control system is not within the predetermined range of step 210; (iii) it is determined in step 212 that the voltage of the relay is not within the predetermined range of step 212; and (iv) the maximum crank speed of the engine is less than or equal to the predetermined threshold. Otherwise, in the depicted embodiment, the Vehicle No Start Flag is set to "False" in step 218. It will be appreciated that in various embodiments the Vehicle No Start Flag may be based on a single one of the determinations of steps 208-215, and/or a subset of these determinations, and/or in combination with one or more other determinations. Also, as discussed above, in the depicted embodiment the process proceeds to step 220 following either of step 216 or step 218.

The Vehicle No Start Flag is retrieved from memory (step 220). In one embodiment, the Vehicle No Start Flag (as updated from step 216 or step 218) is retrieved from the stored values 184 of the memory 174 of FIG. 1 by the processor 172 of FIG. 1. In certain embodiments, this step may be performed, in whole or in part, by one or more other processors and/or memory, such as part of a remote server, for example the processor 192 and memory 193 of FIG. 1.

A determination is made as to whether the Vehicle No Start Flag has been set to "True" or "False" (step 224). In one embodiment, this determination is made by the processor 172 of FIG. 1. In certain embodiments, this step may be performed, in whole or in part, by one or more other processors, such as part of a remote server, for example the processor 192 of FIG. 1.

If it is determined in step 224 that the Vehicle No Start Flag has been set to "False", then an Engine Start Parameter is saved in memory with a Successful Start Flag (step 226). In one embodiment, the processor 172 of FIG. 1 sets the Successful Start Flag for the Engine Start Parameter and saves the Engine Start Parameter with the Successful Start Flag in a circular buffer of the memory 174 as stored values 184 therein. In certain embodiments, this step may be performed, in whole or in part, by one or more other processors and/or memory, such as part of a remote server, for example the processor 192 and memory 193 of FIG. 1.

In addition, also if it is determined in step 224 that the Vehicle No Start Flag has been set to "False", a Vehicle Successful Start Event Counter is incremented (step 228). In one embodiment, the Vehicle Successful Start Event Counter is incremented by the processor 172 of FIG. 1 and stored in the circular buffer of the memory 174 as a stored value 184 therein. Also in one embodiment, the Vehicle Successful Start Event Counter is incremented up until the circular buffer reaches a maximum buffer size, after which the current event replaces the oldest event in the buffer. For example, in one embodiment, if the buffer size is for four vehicle starts and the buffer currently includes four previous starts (i.e. start 1 at a first point in time, start 2 at a second point in time subsequent to the first point in time, start 3 at a third point in time subsequent to the second point in time, and start 4 at a fourth point in time subsequent to the third point in time), then data pertaining to a fifth vehicle start (start 5) at a fifth point in time subsequent to the fourth point in time would replace the oldest existing data (i.e. start 1) when the buffer has reached capacity, and so on. In one embodiment, following step 228, the process returns to step 202 for the next vehicle start instruction. In certain embodiments, this step may be performed, in whole or in part, by one or more other processors and/or memory, such as part of a remote server, for example the processor 192 and memory 193 of FIG. 1.

Conversely, it is determined in step 224 that the Vehicle No Start Flag has been set to "True", then an Engine Start Parameter is saved in memory with an Unsuccessful Start Flag (step 230). In one embodiment, the processor 172 of FIG. 1 sets the Unsuccessful Start Flag for the Engine Start Parameter and saves the Engine Start Parameter with the Unsuccessful Start Flag in a circular buffer of the memory 174 as stored values 184 therein. In certain embodiments, this step may be performed, in whole or in part, by one or more other processors and/or memory, such as part of a remote server, for example the processor 192 and memory 193 of FIG. 1.

Also, in certain embodiments, a cause of the no start event is determined (step 232). In various embodiments, the cause of the no start event is determined via a processor (e.g. the processor 172 and/or processor 192 of FIG. 1) by identifying one or more vehicle parts or components deemed to be responsible for the engine's failure to start, using the various parameter values of step 204 from the sensor array 103 of FIG. 1. For example, in various embodiments, the cause of the no start event is determined by a processor (e.g. processors 172 and/or 192 of FIG. 1) using one or more of the following parameters, among other possible parameters: (i) the position and movement of the cylinder unit 131 (e.g. a speed of pistons thereof) as measured via the cylinder unit sensors 161; (ii) the position and movement of the crank shaft 132 (e.g. whether the crank shaft 132 has made a complete crank, along with the revolutions per minute, or RPM, of the crank shaft 132) measured via the crank shaft sensors 162; (iii) a level or velocity of flow of fluid within the injectors 133 measured via the injector sensors 163; (iv) the position and movement of the cam shaft 134 (e.g. the revolutions per minute, or RPM, of the cam shaft 134) measured via the cam shaft sensors 164; (v) a voltage of the relay 135 measured via the relay sensors 165; (vi) a voltage of the control system 102 measured via the control system sensors 167; (vii) one or more other ESS 140 parameters, such as an ESS current measured by the current sensors 168; and/or (viii) one or more starter parameters (e.g. voltage/current), and/or other starter parameters, and/or any number of other vehicle parameters.

In addition, a Vehicle Unsuccessful Start Event Counter is incremented (step 234). In one embodiment, the Vehicle Unsuccessful Start Event Counter is incremented by the processor 172 of FIG. 1 and stored in the circular buffer of the memory 174 as a stored value 184 therein. In certain embodiments, this step may be performed, in whole or in part, by one or more other processors and/or memory, such as part of a remote server, for example the processor 192 and memory 193 of FIG. 1. Also in one embodiment, similar to the discussion above with respect to step 228, the Vehicle Unsuccessful Start Event Counter is incremented up until the circular buffer reaches a maximum buffer size, after which the current event replaces the oldest event in the buffer. For example, in one embodiment, if the buffer size is for four vehicle starts and the buffer currently includes four previous starts (i.e. start 1 at a first point in time, start 2 at a second point in time subsequent to the first point in time, start 3 at a third point in time subsequent to the second point in time, and start 4 at a fourth point in time subsequent to the third point in time), then data pertaining to a fifth vehicle start (start 5) at a fifth point in time subsequent to the fourth point in time would replace the oldest existing data (i.e. start 1) when the buffer has reached capacity.

In certain embodiments, a no-start event code is set (step 236). In certain embodiments, during step 236, a code (e.g. a trouble code, such as a diagnostic trouble code (DTC) or UTC) is set based on the cause of the no start event as determined in step 232. In one embodiment, the code is kept in the background for analysis by the processors (e.g. processors 172 and/or 192 of FIG. 1) and not necessarily presented for the user at this time. Also, in one embodiment, the UTC code refers to a particular vehicle part deemed to have caused the no start event. Also in one embodiment, the UTC code is set by one or more processors (e.g. the processor 172 and/or processor 192 of FIG. 1).

The vehicle no start event history is retrieved (step 238). In one embodiment, the history of recent starting events (in which the engine of the vehicle successfully started in response to a user request) and non-starting events (in which the engine of the vehicle did not successfully start in response to a user request) is retrieved, along with the Vehicle Successful Start Event Counter of step 228 and the Vehicle Unsuccessful Start Event Counter of step 234, as part of the no start event history from a circular buffer of the memory 174 of FIG. 1 (as stored values 184 thereof) by the processor 172 of FIG. 1. In one embodiment, respective causes of the no-start events as determined in various iterations of step 232 (for example, as represented in the UTC codes of respective iterations of step 236) are also included as part of the no start event history. In addition, in one embodiment, the various vehicle parameters of step 204 are also included as part of the vehicle no start event history. In certain embodiments, this step may be performed, in whole or in part, by one or more other processors and/or memory, such as part of a remote server, for example the processor 192 and memory 193 of FIG. 1.

The vehicle no start event history is transmitted (step 240). In one embodiment, the vehicle no start event history retrieved in step 238 is transmitted in step 240 by a transmitter (such as the transceiver 104 of FIG. 1) via instructions provided by a processor (such as the processor 172 of FIG. 1) from the vehicle 100 to a remote server (such as the remote server 110 of FIG. 1) via a wireless network (such as the wireless communications network 111 of FIG. 1).

In one embodiment, following step 240, the process, as executed within the vehicle, returns to step 202 for the next vehicle start instruction. In addition, also in one embodiment, the process also continues to step 240, through execution by the remote server, as discussed below.

During step 240, the remote server receives the vehicle no start event history. In one embodiment, the receiver 190 (or multiple receivers 190) of the remote server 110 of FIG. 1 receives the vehicle no start event history of vehicle 100 of FIG. 1, as well as from various other vehicles. Also in one embodiment, the remote server 110 aggregates the no start event history from the various vehicles (step 244), and makes various determinations based on the aggregation (step 246).

In one such embodiment, the remote server 110 aggregates the no start event history of vehicles of a common make and model, and makes determinations regarding such vehicles (e.g. as to whether a particular vehicle model is experiencing a relatively high number of vehicle no start events and/or a relatively high number of common causes for vehicle no start events). In various embodiments, similar aggregation and determinations may be made with respect to vehicles sharing a common engine type, and/or sharing parts from a common supplier, sharing common modes of operation, sharing common types of hardware or software, sharing common types of calibrations, sharing one or more other various common modes of operation, and so on. In certain embodiments, the aggregation and determinations of steps 244 and 246 are performed by the processor 192 of FIG. 1 (e.g. executing one or more programs 194 of FIG. 1), with relevant inputs, outputs, and results stored in the memory 193 as stored values 195 therein.

In certain embodiments, appropriate actions may be taken based on the aggregation of step 244 and the determinations of step 246 (step 248). The actions may be used to help alleviate or prevent no start events in vehicles in response to subsequent user engine start requests. For example, in certain embodiments, a reprogramming of an engine module, a replacement of a particular part, and/or one or more other actions may be taken for vehicles sharing a common vehicle model, engine type, and/or other shared characteristic(s) that may be contributing to similar vehicle no start issues. The aggregation and determinations may also be utilized in, among other users, subsequent vehicle manufacturing and development (e.g. for subsequent vehicle model years, and so on). In certain embodiments, the actions of step 248 may be taken by, and/or recommended by, the processor 192 of FIG. 1. Also in certain embodiments, the actions may include program, software, or firmware updates that are pushed through as appropriate (e.g. if current program, software, or firmware requires an update).

Accordingly, methods, systems, and vehicles are provided that include monitoring of no start events for vehicles. In one embodiment, the no start history of a vehicle is monitored by a processor within the vehicle, and a no start event history is transmitted by the vehicle to a remote server via a wireless connection. Also in one embodiment, respective no start event histories from various other vehicles are also transmitted to and received by the remote server, and the no start event histories are aggregated for determinations that may be used to help prevent or alleviate no start events going forward.

It will be appreciated that the disclosed methods, systems, and vehicles may vary from those depicted in the Figures and described herein. For example, the vehicle 100, the engine 130, the control system 102, the remote server 110, and/or various components thereof may vary from that depicted in FIG. 1 and described in connection therewith. In addition, it will be appreciated that certain steps of the process 200 may vary from those depicted in FIG. 2 and/or described above in connection therewith. It will similarly be appreciated that certain steps of the method described above may occur simultaneously or in a different order than that depicted in FIG. 2 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

What is claimed is:

1. A method comprising:
    measuring, via a sensor onboard a vehicle, sensor values pertaining to operation of an engine of a vehicle propulsion system of the vehicle in response to a start request that has been made by a user of the vehicle, via an engine starting mechanism of the vehicle, to start the engine of the vehicle propulsion system of the vehicle;
    determining when a no start event has occurred for the vehicle via a computer processor disposed onboard the vehicle using the sensor values pertaining to the operation of the engine of the propulsion system of the vehicle, wherein a no start event is determined to have occurred when the engine does not start in response to the start request; and
    generating, via the computer processor disposed onboard the vehicle, a no start event history for the vehicle based on the determining by the computer processor disposed onboard the vehicle as to whether a no start event has occurred over multiple vehicle ignition cycles for the vehicle, wherein the generating of the no start event history is performed by the computer processor such that the no start event history includes both (a) and (b) below, namely:
    (a) at least one from among a diagnostic trouble code (DTC) or a UTC; and
    (b) at least one from among (i) a position and movement of a cylinder unit of the engine of the vehicle; (ii) a position and movement of a crank shaft of the engine of the vehicle; (iii) a level or velocity of flow of fluid for the engine of the vehicle; (iv) a position and movement of a cam shaft of the engine of the vehicle; (v) a voltage of a relay of the engine of the vehicle; (vi) a voltage of a control system for the engine of the vehicle; (vii) a battery resistance of a battery for the engine of the vehicle; and (viii) a starter resistance of a starter for the engine of the vehicle.

2. The method of claim 1, further comprising:
    transmitting the no start history from the vehicle to a remote server via a transmitter via instructions provided by the computer processor disposed onboard the vehicle.

3. The method of claim 1, further comprising:
    determining a cause of the vehicle no start event using the sensor values, via the computer processor disposed onboard the vehicle, based on sensor data from one or more additional sensors disposed onboard the vehicle;
wherein the no start event history includes the causes of the no start events.

4. The method of claim 2, further comprising:
aggregating, via a second computer processor disposed at the remote server, respective no start event histories for a plurality of different vehicles of a shared vehicle model.

5. The method of claim 1, wherein:
the step of measuring sensor values comprises measuring, via crank shaft sensors disposed onboard the vehicle, movement of an engine crank of the vehicle after the start request has been made to start the engine;
the step of determining when a no start event has occurred comprises determining whether a no start event has occurred based at least in part on a determination by the computer processor disposed onboard the vehicle, using the sensor values measured by the crank shaft sensors, as to whether the engine crank has rotated at least one complete revolution after the start request has been made to start the engine.

6. The method of claim 1, wherein:
the step of measuring sensor values comprises measuring, via voltage sensors disposed onboard the vehicle, a voltage of a control system associated with the engine after the start request has been made to start the engine;
the step of determining when a no start event has occurred comprises determining whether a no start event has occurred based at least in part on a determination by the computer processor disposed onboard the vehicle, using the sensor values measured by the voltage sensors, as to whether the voltage of the control system is within a predetermined range after the start request has been made to start the engine.

7. The method of claim 1, wherein:
the step of measuring sensor values comprises measuring, via voltage sensors disposed onboard the vehicle, a voltage of a powertrain relay associated with the engine after the request has been made to start the engine;
the step of determining when a no start event has occurred comprises determining whether a no start event has occurred based at least in part on a determination by the computer processor disposed onboard the vehicle, using the sensor values measured by the voltage sensors, as to whether the voltage of the powertrain relay is within a predetermined range after the start request has been made to start the engine.

8. The method of claim 1, wherein:
the step of measuring sensor values comprises measuring, via crank shaft sensors disposed onboard the vehicle, movement of an engine crank of the vehicle after the request has been made to start the engine;
the step of determining when a no start event has occurred comprises determining whether a no start event has occurred based at least in part on whether on a determination by the computer processor disposed onboard the vehicle, using the sensor values measured by the crank shaft sensors, as to a maximum crank rotation speed is within a predetermined range after the start request has been made to start the engine.

9. The method of claim 1, wherein:
the step of measuring sensor values comprises:
measuring first sensor values, namely, movement of an engine crank of the vehicle after the request has been made to start the engine, via crank shaft sensors disposed onboard the vehicle;
measuring second sensor values, namely, a voltage of a control system associated with the engine after the request has been made to start the engine, via first voltage sensors disposed onboard the vehicle; and
measuring third sensor values, namely, a voltage of a powertrain relay associated with the engine after the request has been made to start the engine, via second voltage sensors disposed onboard the vehicle; and
the step of determining when a no start event has occurred comprises determining, via the computer processor disposed onboard the vehicle, whether a no start event has occurred based at least in part on each of the following:
whether the engine crank has rotated at least one complete revolution after the request has been made to start the engine, based on the first sensor values;
whether the voltage of the control system is within a first predetermined range after the request has been made to start the engine, based on the second sensor values;
whether the voltage of the powertrain relay is within a second predetermined range after the request has been made to start the engine, based on the third sensor values; and
whether a maximum crank rotation speed is within a third predetermined range after the request has been made to start the engine, based on the first sensor values.

10. A system comprising:
a sensor disposed onboard a vehicle and configured to measure sensor values pertaining to operation of an engine of a vehicle propulsion system of the vehicle in response to a start request that has been made by a user of the vehicle, via an engine starting mechanism of the vehicle, to start the engine of the vehicle propulsion system of the vehicle;
a computer processor disposed onboard the vehicle and coupled to the sensor and configured to determine when a no start event has occurred for the vehicle using the sensor values, wherein the computer processor determines that a no start event has occurred when the engine does not start in response to the start request, wherein the computer processor is configured to generate a no start history for the vehicle based on the determinations as to whether the no start event has occurred, such that the no start history includes both (a) and (b) below, namely:
(a) at least one from among a diagnostic trouble code (DTC) or a UTC; and
(b) at least one from among (i) a position and movement of a cylinder unit of the engine of the vehicle; (ii) a position and movement of a crank shaft of the engine of the vehicle; (iii) a level or velocity of flow of fluid for the engine of the vehicle; (iv) a position and movement of a cam shaft of the engine of the vehicle; (v) a voltage of a relay of the engine of the vehicle; (vi) a voltage of a control system for the engine of the vehicle; (vii) a battery resistance of a battery for the engine of the vehicle; and (viii) a starter resistance of a starter for the engine of the vehicle; and
a transmitter disposed onboard the vehicle, coupled to the processor, and configured to transmit, to a remote server, the no start event history for the vehicle based on the determining by the processor transmitter via instructions provided by the computer processor disposed onboard the vehicle.

11. The system of claim 10, wherein:
the computer processor disposed onboard the vehicle is further configured to determine a cause of the vehicle no start event using sensor data from one or more additional sensors disposed onboard the vehicle; and
the transmitted no start event history includes the causes of the no start events.

12. The system of claim 10, further comprising:
a second processor associated with the remote server, the second processor configured to aggregate respective no start event histories for a plurality of different vehicles of a shared vehicle model and a shared type of vehicle.

13. The system of claim 10, wherein:
the vehicle has a battery;
the system further comprises a battery sensor configured to set a battery no-start flag based at least in part on a drop in measured voltage and an increase in measured current for the battery; and
the computer processor is configured to determine that the no start event has occurred based at least in part on whether the battery no-start flag has been set.

14. The system of claim 10, wherein:
the sensor comprises a crank shaft sensor that is configured to measure movement of an engine crank of the vehicle after the start request has been made to start the engine; and
the computer processor is configured to determine when a no start event has occurred based at least in part on whether the engine crank has rotated at least one complete revolution after the start request has been made to start the engine.

15. The system of claim 10, wherein:
the sensor comprises a voltage sensor that is configured to measure a voltage of a control system associated with the engine after the start request has been made to start the engine; and
the computer processor is configured to determine when a no start event has occurred based at least in part on whether the voltage of the control system is within a predetermined range after the request has been made to start the engine.

16. The system of claim 10, wherein:
the sensor comprises a voltage sensor that is configured to measure a voltage of a powertrain relay associated with the engine after the start request has been made to start the engine; and
the computer processor is configured to determine when a no start event has occurred based at least in part on whether the voltage of the powertrain relay is within a predetermined range after the start request has been made to start the engine.

17. The system of claim 10, wherein:
the sensor comprises a crank shaft sensor that is configured to measure movement of an engine crank of the vehicle after the start request has been made to start the engine; and
the computer processor is configured to determine when a no start event has occurred based at least in part on whether a maximum crank rotation speed is within a predetermined range after the start request has been made to start the engine.

18. The system of claim 10, wherein the system includes:
a first sensor configured to measure movement of an engine crank of the vehicle after the request has been made to start the engine;
a second sensor configured to measure a voltage of a control system associated with the engine after the request has been made to start the engine;
a third sensor configured to measure a voltage of a powertrain relay associated with the engine after the request has been made to start the engine; and
the computer processor is configured to determine whether a no start event has occurred based at least in part on each of the following:
whether the engine crank has rotated at least one complete revolution after the request has been made to start the engine;
whether the voltage of the control system is within a first predetermined range after the request has been made to start the engine;
whether the voltage of the powertrain relay is within a second predetermined range after the request has been made to start the engine;
whether a maximum crank rotation speed is within a third predetermined range after the request has been made to start the engine.

19. A vehicle comprising:
a propulsion system including an engine;
a plurality of sensors configured to measure sensor values pertaining to the operation of the engine of the propulsion system for the vehicle after a start request has been made by a user of the vehicle, via an engine starting mechanism of the vehicle, to start the engine vehicle propulsion system;
a computer processor coupled to the plurality of sensors and configured to determine when a no start event has occurred for the vehicle using the sensor values, wherein the computer processor determines that a no start event has occurred when the engine does not start in response to the start request, wherein the computer processor is configured to generate a no start history for the vehicle based on the determinations as to whether the no start event has occurred, such that the no start history includes both (a) and (b) below, namely:
(a) at least one from among a diagnostic trouble code (DTC) or a UTC; and
(b) at least one from among (i) a position and movement of a cylinder unit of the engine of the vehicle; (ii) a position and movement of a crank shaft of the engine of the vehicle; (iii) a level or velocity of flow of fluid for the engine of the vehicle; (iv) a position and movement of a cam shaft of the engine of the vehicle; (v) a voltage of a relay of the engine of the vehicle; and (vi) a voltage of a control system for the engine of the vehicle; and
a transmitter coupled to the processor and configured to transmit, via instructions provided by the computer processor, to a remote server, the no start event history for the vehicle based on the determining by the processor.

20. The method of claim 1, wherein the vehicle comprises an automobile.

* * * * *